United States Patent Office 3,083,115
Patented Mar. 26, 1963

3,083,115
PROCESS FOR THE INTRODUCTION OF FINELY DIVIDED SOLID FILLERS INTO LACQUERS
Erich Bäder, Hanau (Main), Germany, assignor to Deutsche Gold- und Silber-Scheideanstalt vormals Roessler, Frankfurt am Main, Germany, a corporation of Germany
No Drawing. Filed Dec. 22, 1959, Ser. No. 861,220
2 Claims. (Cl. 106—208)

This invention deals with a process for the introduction of finely divided solid fillers into lacquers and with an intermediate stably-liquid flatting agent concentrate which is particularly useful in such a process. Said process and product are particularly suitable for, and adapted to the handling of, highly active finely divided fillers composed of oxides of metals or metalloids, such as silicon dioxide, aluminum oxide, titanium dioxide, or the like, produced in a pyrogenic manner by the decomposition or reaction of the corresponding volatile compound in the vapor phase.

It is known that finely divided oxides obtained as a fume from a flame or pyrogenic reaction, especially silicon dioxide, can be advantageously used already in relatively small quantities in lacquers as sedimentation inhibitors or flatting agents. These oxides, which consist predominantly of discrete particles of about 5 to 100 millimicrons in equivalent diameter and have large specific surfaces, in many instances, are difficult to incorporate and disperse fully into various liquids, probably because of their extreme fineness of subdivision and low bulk density and their extreme tendency to dust formation. Consequently, it is usually necessary to employ some type of intensive high shear mixing, e.g., roll mills, ball mills, or other colloid mills in order to attain a homogeneous liquid dispersion or distribution under uniform wetting of such materials in liquid systems. Even then excessive thickening and gelling is often encountered in aqueous systems as well as in strongly non-polar organic liquids.

In accordance with this invention it has been found that the above mentioned difficulties can be effectively avoided in the manufacture of flat, semigloss or matte-finish type clear lacquer, and the lacquer industry thus relieved of dispersion difficulties in the use of the aforesaid fillers, by preparing a preliminary filler dispersion with high solid content in certain organic liquid media. The said liquid media are of such special character that the said finely divided pyrogenic oxide fillers can be dispersed therein at concentrations of at least 25, and preferably about 30 to 45% of the total dispersion by weight and yet the resultant dispersions are stably liquid and directly miscible and blendable with the other components of the complete lacquer. Thus it is possible to avoid working the total lacquer quantity through an intensive shearing or colloid milling step since the blending of the preliminary dispersion with the other components of the lacquer can take place already in the shortest time by merely stirring them together. In order to obtain the best results and most stable product, however, the preparation of the preliminary dispersion from finely divided oxide and the organic liquid media, on the other hand, should be carried out with the aid of intensive shearing or a colloid type milling step.

The process of the present invention depends on the establishment of the surprising fact that certain organic liquids, despite the known marked thickening effect of finely divided oxides, are able to take up higher quantities of these solid materials than expected without losing the character of a liquid. It is necessary, however, for this to make a certain selection of the dispersion liquid, characterized not only by the fact that it must be compatible with the lacquer components but primarily it must exhibit a rather polar character relative to most organic liquids, i.e., it must contain at least one predominantly hydrophilic functional group. Fulfilling these requirements particularly well are simple organic compounds having a molecular structure containing a maximum of six carbon atoms and at least one relatively polar functional group such as —OH, =C=O, and

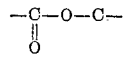

While non-polar organic liquids such as the ordinary hydrocarbons have only a relatively slight capacity for taking up the solid filler material, e.g., for silicic acid obtained pyrogenically, and as dispersion media are not suitable for the purposes of the present invention, unexpectedly liquids with a mixture of polar and non-polar groups in the molecule were found to be especially suitable such as the lower aliphatic alcohols, glycols, esters, ketones, etc. Also the same is true for certain physical mixtures of separate polar and non-polar substances, which like the previously mentioned liquids can readily take up to 40 to 50% their own weight of solids, without a thickening into paste or even into pseudo-solid bodies taking place. In the following Table I, some dispersion agents, suitable for the purposes of the invention, are listed with a statement of their ability to take up silicic acid, obtained pyrogenically, and having an average particle size of about 15–20 millimicrons and a specific surface of about 150 to 250 m.²/g. All the dispersions are liquid initially and after storage for periods of several weeks in closed containers.

TABLE I

| Dispersion agent: | Silicon dioxide, percent |
|---|---|
| Methanol | 39 |
| Ethanol | 31 |
| n-Propanol | 42 |
| n-Butanol | 45 |
| i-Propanol | 37 |
| i-Butanol | 40 |
| Isanol (60% n-butanol+40% i-butanol) | 43 |
| Methyl glycol | 38 |
| Butyl glycol | 42 |
| Toluol | 11 |
| Benzol | 11 |
| Petroleum ether | 12 |

In the last part of the table, in contrast to the polar liquids, toluol, benzol, and petroleum ether are given as examples of non-polar liquids, from which it becomes evident how markedly these two types of liquids differ from each other in their ability to take up substances of the finely divided pyrogenic solid oxide type.

The following table shows corresponding experiments, which were carried out with physical mixtures of separate polar and non-polar organic liquids, except that in this case the pyrogenic silicic acid used had a specific surface of about 300 to 380 m.²g., being composed of particles between about 5 and about 20 millimicrons in size. The test for stability once again was that the dispersions remain fluid after standing in closed containers for periods of several weeks.

TABLE II

| Dispersion agent: | Silicon dioxide, percent |
|---|---|
| Ethanol | 28 |
| Ethanol/benzol, 90/10 | 34 |
| Ethanol/petroleum ether, 90/10 | 38 |
| Ethanol/toluol, 90/10 | 36 |
| i-Propanol | 33 |
| i-Propanol/petroleum ether, 90/10 | 41 |

TABLE II—Continued

| Dispersion agent: | Silicon dioxide, percent |
|---|---|
| i-Propanol/benzol, 85/15 | 38 |
| i-Propanol/toluol, 85/15 | 43 |
| Petroleum ether | 9 |
| Benzol | 11 |
| Toluol | 11 |

It is clear from the table that by use of dispersion agents, which consist of a predominantly polar physical mixture of separate polar and non-polar organic liquids, the maximal ability for taking up finely divided oxides can be raised far above the values to be expected additively.

A special advantage of the described dispersions containing high quantities of solid materials, serving for incorporating the fillers in lacquers, is evident from the fact that these dispersions exhibit an exceptionally favorable storage ability. For example, a dispersion of 40% silicon dioxide in n-butanol, after five weeks' storage in a standard pressure sealed can, was only slightly thickened and could be readily liquefied by brief thorough stirring. Another dispersion of similar composition, under the same conditions, at the end of the mentioned storage period was even still completely liquid.

This property of the dispersions used in accordance with the invention was also verified by viscosity measurements. It was thereby found that both the viscosity itself, as also the thixotropic properties of the highly concentrated dispersions, remained practically completely unchanged over a time period of three weeks, so that these dispersions could be used unhesitatingly for incorporation of the fillers into the lacquer, also after this storage period.

For the practical execution of the process according to the invention it was found to be especially advantageous not to add the dispersion directly into the lacquer, but rather to incorporate it by simply stirring into the lacquer thinner and only then combining this with the lacquer. In this way an especially simple and uniform distribution of the filler in the lacquer occurs, this leading to a completely uniform, spot-free, soft matte type finish when the lacquer is used.

The execution of the process according to the invention is elucidated below by means of an example.

Example

A 35% dispersion of a finely divided pyrogenically produced silica, known by the trade name "Aerosil" and having an average particle size of about 20 millimicrons and a surface area of about 200 m.²/g., in n-butanol is prepared by a multipass procedure on a three roll mill. The resultant flatting agent concentrate is completely fluid. The composition of the nitro-lacquer to be flatted was as follows:

| | Parts by weight |
|---|---|
| Toluol | 306 |
| Butyl acetate, 85% | 150 |
| Acetic ester | 122 |
| Butanol | 31 |
| Collodium wool (butanol-moist) | 262 |
| Collodium wool (dry) | 170 |
| Dibutyl phthalate | 38 |
| Modified urea resin | 88 |

As thinner the following mixture was used:

| | |
|---|---|
| Toluol | 306 |
| Butyl acetate | 150 |
| Acetic ester | 122 |
| Butanol | 31 |

A total of 5.3 g. of the flatting agent concentrate prepared as described at the beginning of this example and containing 35% by weight or 1.85 g. silicon dioxide was stirred into 25 g. of the above lacquer thinner with a rapidly operating stirrer, and 80 parts by weight of the resultant diluted flatting agent dispersion was then mixed with 100 parts of lacquer in the same manner. An exceptionally well matting lacquer resulted, in which phenomena of sedimentation or distintegration into components over a time period of 4 weeks did not appear.

Many changes can be made in the above example without affecting the success of the results obtained. For example, in place of the silica a finely divided titania or alumina of equivalent particle size can be used. Also, in place of n-butanol, a mixture 85% isopropanol with 15% toluol can be used as the organic liquid medium in the liquid flatting agent concentrate. Moreover, as is well known by those skilled in the art other clear solvent type lacquers based on other cellulose type resins and a wide variety of solvents, latent solvents, and compatible liquid diluents can be used with equally good results. Reference is made to chapters XVIII and XIX of the book by Elias Singer entitled "Fundamentals of Paint, Varnish, and Lacquer Technology," published 1957 by the American Paint Journal Company of St. Louis, Mo., for a more complete discussion of cellulose-resin lacquers, components and formulations.

Having described my invention and preferred embodiments thereof what I claim and desire to secure by U.S. Letters Patent is:

1. A completely fluid flatting agent concentrate, which can be incorporated directly into clear lacquer systems without resort to intensive shear type mixing by merely blending same with remaining components of a conventionally formulated, clear, solvent-type lacquer, said concentrate consisting esentially of at least 25% based upon the total weight of said concentrate of a pyrogenically produced metal oxide having an average particle size of between 5 and 100 millimicrons uniformly dispersed in a single phase, consisting essentially of a non-aqueous, relatively polar organic liquid medium selected from a group of aliphatic alcohols having 1 to 4 carbon atoms and glycols having up to 6 carbon atoms and containing also between about 10 and about 15% by weight based on the total liquid medium of a hydrocarbon diluent.

2. Process for incorporation of finely divided pyrogenic solid metal oxides into solvent type lacquers comprising dispersing said oxide thoroughly in concentrations of at least 25% by weight of the resulting dispersion by means of an intensive shear-type mixing action into a single phase, essentially non-aqueous, relatively polar organic liquid medium which is compatible with the solvent system of the particular lacquer into which it is desired to incorporate said finely divided oxides, said organic liquid medium consisting essentially of about 10 to 15% by weight of a hydrocarbon diluent with the balance being selected from a group consisting of aliphatic alcohols having 1 to 4 carbon atoms and glycols having up to 6 carbon atoms, and then blending the resulting fluid dispersion with remaining components of said lacquer by means of simple stirring and without resort to intensive, heavy-duty, shear-type mixing.

References Cited in the file of this patent

UNITED STATES PATENTS

| 2,622,987 | Ratcliffe | Dec. 23, 1952 |
| 2,876,119 | Dithmar et al. | Mar. 3, 1959 |
| 2,882,177 | Newton | Apr. 14, 1959 |
| 2,892,730 | Kloepfer et al. | June 30, 1959 |
| 2,973,282 | Gross | Feb. 28, 1961 |